July 17, 1962     H. L. SPEROW     3,044,646
TRAILER FOR BOATS
Filed Aug. 17, 1959     4 Sheets-Sheet 3
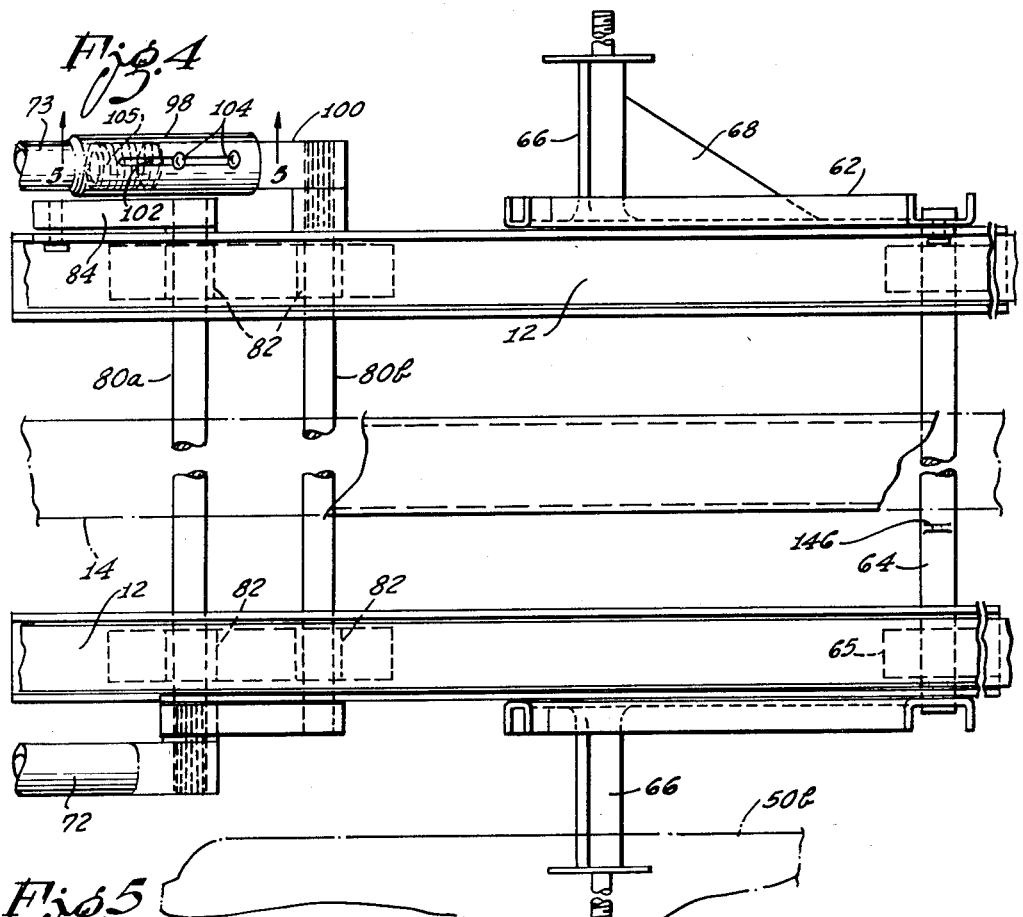
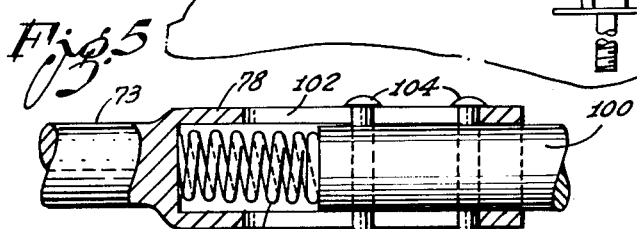
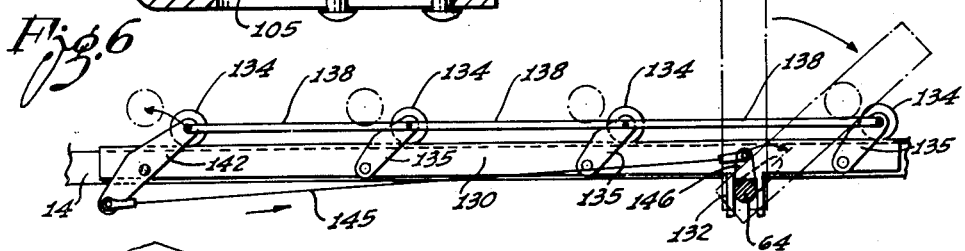
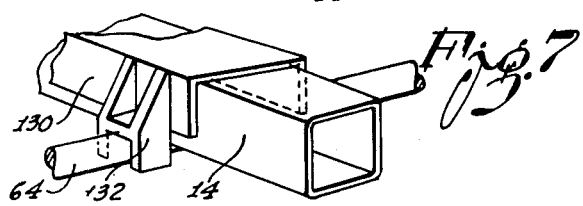
INVENTOR
Henry L. Sperow
Attorneys

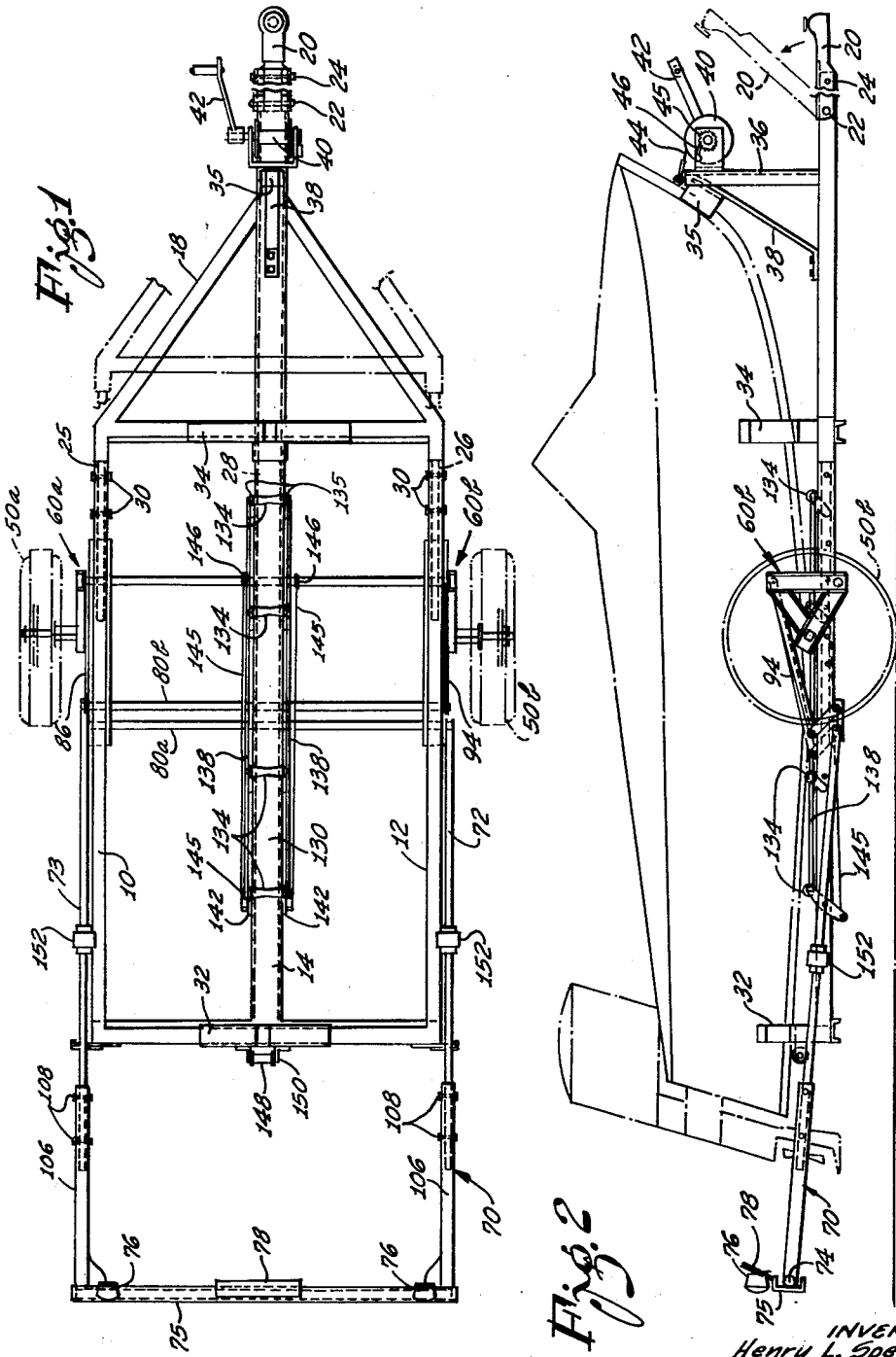

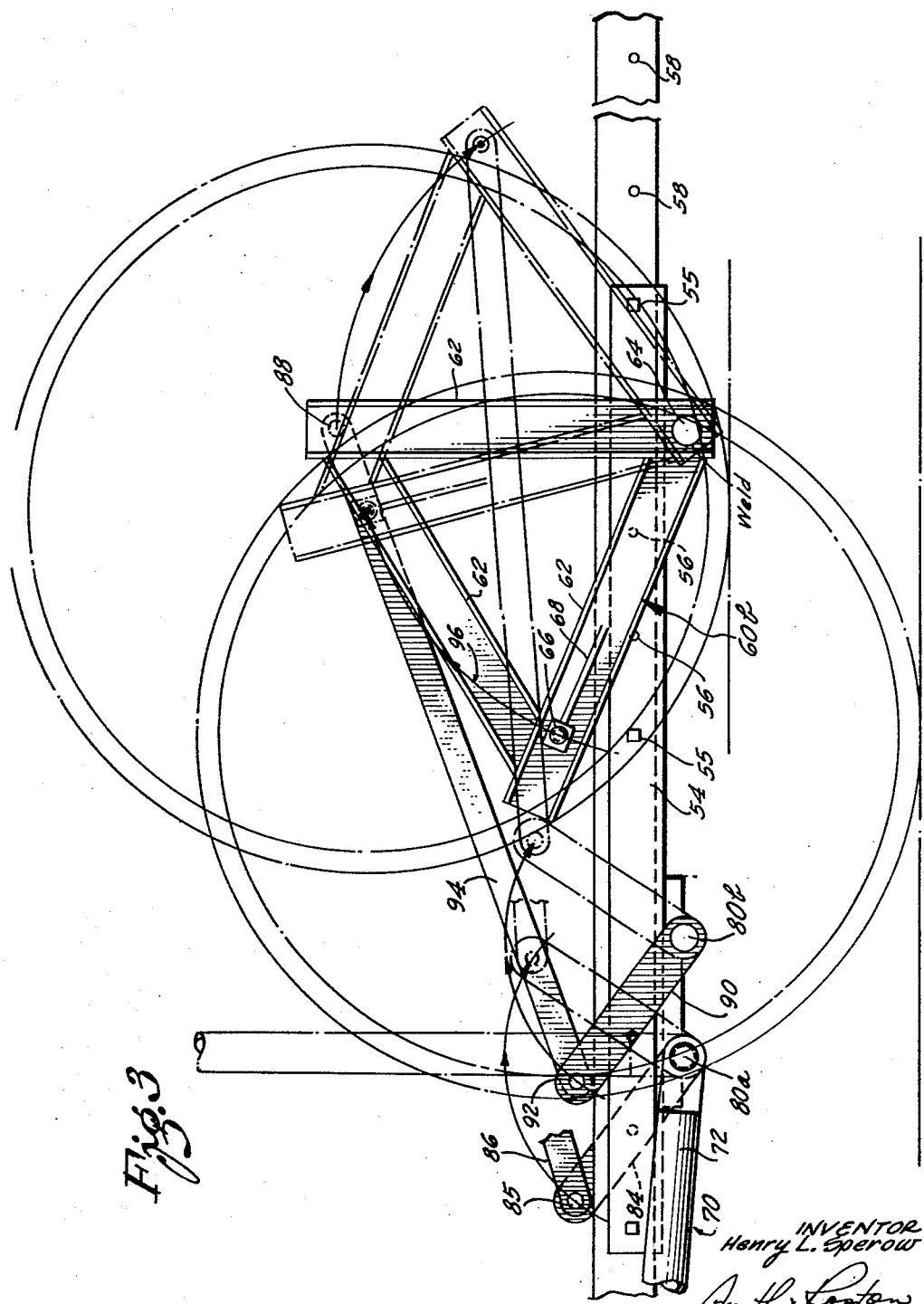

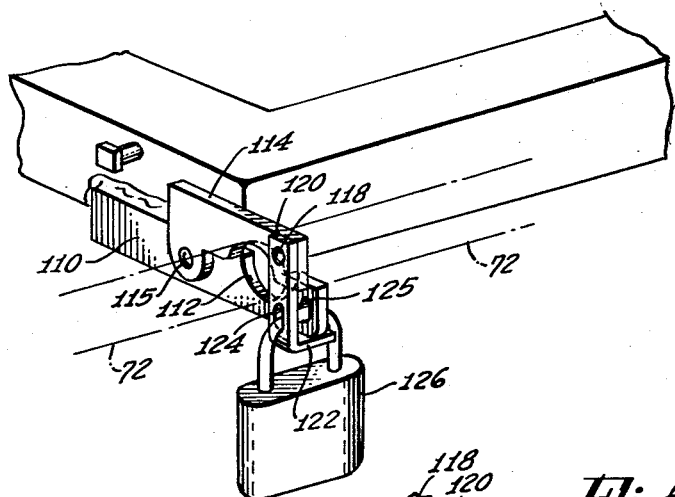
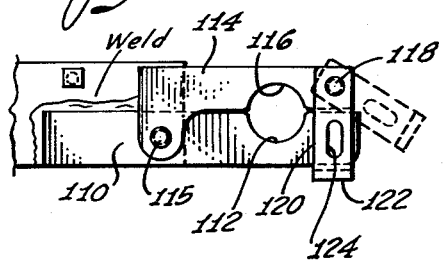
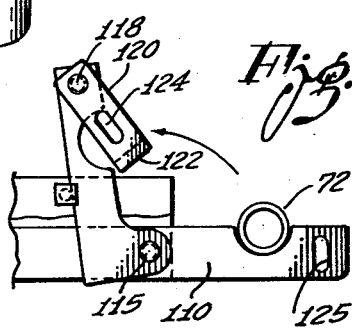

United States Patent Office 3,044,646
Patented July 17, 1962

3,044,646
TRAILER FOR BOATS
Henry L. Sperow, 5160 W. 136th St., Hawthorne, Calif.
Filed Aug. 17, 1959, Ser. No. 834,302
11 Claims. (Cl. 214—505)

This invention relates to trailers for towing large objects. While the invention is widely applicable, it has been initially embodied in a trailer for hauling, launching and loading a boat. This initial embodiment of the invention has been selected for the purpose of disclosure and to provide adequate guidance for those skilled in the art who may have occasion to apply the same principles to other specific purposes.

A boat must be carried at a relatively high level when transported by trailer on highways. If the relatively high trailer frame is tilted for launching a boat onto a lake, the trailer must be moved to correspondingly deep water at a substantial distance from the shore to keep the greatly inclined boat from ramming downward into the lake bottom. On the other hand, if the trailer is of the vertical lift type wherein the trailer frame may be lowered in a substantially horizontal attitude, the boat may be launched and reloaded in shallow water close to the shore. The present invention is directed, therefore, to the solution of problems that arise in the construction of a vertical lift trailer for hauling, launching and reloading boats.

One problem is to provide a practical construction that is relatively inexpensive. A second problem is to incorporate in such a construction a spring suspension to absorb shocks and to afford a relatively "soft" ride on the highway. Another problem is to provide a vertical lift trailer which will function for its purpose without the necessity for submerging the wheel bearings and without the necessity of submerging the tail lights, stop lights and licenes plate on the rear end of the trailer.

Another problem is to provide not only for lowering of the trailer frame but also for sliding the boat off the lowered frame and for subsequently reloading the boat onto the lowered frame. A further problem is to provide a boat trailer which has only a single pair of ground wheels and yet is adjustable for balanced towing of boats of different sizes. A still further problem is to provide such a vertical lift trailer with a rear bumper that will protect the boat during transportation and yet will not interfere with loading and unloading the boat.

The invention meets all of these problems by a combination of features. The two wheels on opposite sides of the trailer frame are mounted on means that pivot relative to the frame to carry each of the wheels in an arc between a high position relative to the frame and a low position relative to the frame thereby to lower and raise the frame. These two wheel-carrying means are connected by suitable linkages with manual actuating means that may be easily and conveniently operated by one man. In the present embodiment of the invention, economy and compactness are both served by incorporating torsion rods in these two linkages to provide the desired shock-absorbing spring means.

In the selected embodiment of the invention, the manually operable actuating means for raising and lowering the trailer frame is a U-shaped yoke having two forwardly extended arms pivotally connected to the trailer frame. Normally, i.e., during travel on highways, this yoke is in a rearward lowered position overhanging the rear end of the trailer frame to serve as a bumper to protect the engine and propeller of the boat. When the time comes to launch the boat, this yoke is manually raised to raise the two ground wheels relative to the trailer frame and thus lower the trailer frame and the boat. Since the ground wheels are not lowered with the frame, the bearings of the ground wheels are not submerged by this operation. The tail lights, stop lights and license plate of the trailer are on the transverse member of the U-shaped actuating yoke and are thus elevated with the yoke to prevent submersion.

The invention further facilitates the launching and reloading of the boat by providing a series of spaced rollers which may be raised to take the weight of the boat off the trailer frame by lifting the boat by its keel. These rollers are raised in response to the lowering of the trailer frame and vice versa. Thus the effort required to lift the series of rollers relative to the trailer frame is lessened by the fact that the trailer frame is being lowered simultaneously. On the other hand, in the reloading procedure wherein the boat is first maneuvered into position on the raised rollers, the effort required to raise the trailer frame is lessened by the simultaneous lowering of the rollers. A further feature of the invention is the concept of providing the two arms of the raised yoke with suitable rollers for contact with the opposite sides of the boat to keep the boat upright in the course of its longitudinal movement in the launching and in the reloading of the boat.

The invention has the further feature of being adaptable to boats of various dimensions and configurations. For this purpose, the trailer frame may be extended in length to carry a relatively long boat. Also for this purpose, the ground wheels are adjustable along the length of the trailer frame for balancing different loads. The U-shaped actuating yoke is extensible as may be required to clear boats of relatively large cross section. It is also to be noted that extending the U-shaped actuating yoke as required to clear a relatively large boat also serves to increase the leverage for handling the added weight of the relatively large boat.

The various features and advantages of the invention may be understood by reference to the following detailed description considered with the accompanying drawings.

In the drawings, which are to be regarded as merely illustrative:

FIG. 1 is a plan view of the selected embodiment of the invention with the trailer frame elevated for normal transportation of a boat;

FIG. 2 is a side elevation of the trailer;

FIG. 3 is a simplified side elevational view that is largely diagrammatic and shows the mechanism for raising and lowering the two ground wheels;

FIG. 4 is an enlarged fragmentary plan view showing a portion of the mechanism for raising and lowering the wheels, parts being omitted for clarity;

FIG. 5 is an enlarged fragmentary section along the line 5—5 of FIG. 4 showing how one of the yoke arms is constructed for limited change in length in the course of the swinging movement of the yoke;

FIG. 6 is a side elevational view of the series of rollers for engaging the keel of the boat to raise and lower the boat relative to the trailer frame;

FIG. 7 is a fragmentary perspective view showing the auxiliary structure on which the series of rollers are mounted;

FIG. 8 is an enlarged perspective view showing means for locking the actuating yoke in its normal lower horizontal position;

FIG. 9 is a fragmentary elevation of the locking means in its closed position; and FIG. 10 is a similar view of the locking means in its open position.

The structure of the selected embodiment of the invention shown in the drawings includes a trailer frame made of tubular stock of rectangular cross-sectional configuration. The trailer frame comprises two longitudinal side members 10 and 12 and a central longitudinal beam 14 which are interconnected by a rearward transverse member 15 and a forward transverse member 16. The central beam 14 extends forward from the transverse member 16 and is braced by diagonal members 18. A forwardly extending hitch arm 20 for coupling the trailer to a towing vehicle is mounted on the forward end of the beam 14 in a hinged manner by means of a pivot bolt 22 and is swingable upward relative to the frame, as indicated in broken lines in FIG. 2. Normally the hitch arm 20 is rigidly maintained in its lower horizontal position by means of a second bolt 24 which removably extends through the beam 14.

It is contemplated that the trailer frame will be longitudinally extensible and contractable, as may be required for hauling boats of different lengths. For this purpose, the trailer frame is divided near the forward transverse member 16 into two telescoping sections as indicated in FIG. 1. The forward section of the frame has two rearwardly extending bars 25 and 26 on its two sides that telescope into the rearward sections of the longitudinal side members 10 and 12, respectively, and in like manner, the forward section of the frame has a larger central bar 28 which telescopes into the rearward section of the beam 14. In a well-known manner, the three bars 25, 26 and 28 and the three longitudinal frame members 10, 12 and 14 are apertured for selective engagement by removable bolts 30 to hold the frame at various degrees of extension in a rigid manner.

The trailer frame is provided with suitable means to stabilize a loaded boat. For this purpose, the trailer frame may be provided in a well-known manner with a rearward cradle 32 and a forward cradle 34. In the construction shown, a forward stabilizing bracket 35 is further provided on a stanchion 36 that is mounted on the central beam 14 and is reinforced by a diagonal brace 38. The stanchion carries a winch 40 which is manually operable by a crank 42 to control a cable 44 that is attached to the prow of the boat. When the boat is loaded for transportation, the cable 44 is reeled in by the winch to hold the prow of the boat in engagement with the stabilizing bracket 35. The winch is provided with the usual ratchet 45 and pawl 46 for releasably holding the winch against reverse rotation.

The trailer has a single pair of opposite ground wheels 50a and 50b which are adjustable along the length of the trailer frame. For this purpose, the two wheels 50a and 50b are directly mounted on auxiliary structure and the auxiliary structure, in turn, is adjustably mounted on the trailer frame. As best shown in FIG. 3, the auxiliary structure may comprise two channel members 54 on opposite sides of the trailer, each of which is mounted on the underside of the corresponding longitudinal side member 10 or 12 of the trailer frame. The two auxiliary channel members 54 are releasably secured by transverse bolts 55. Each of the two auxiliary channel members 54 has a plurality of apertures 56 and each of the corresponding side members 10 and 12 of the trailer frame have similar apertures 58 to receive the bolts 55 as required for selective positioning of the channel members along the length of the trailer frame for balancing of the trailer load on the two wheels.

The wheel 50a is carried by a pivotally mounted triangular structure generally designated 60a which may be termed a triangular wheel-carrying means and the wheel 50b is carried by a second similar triangular wheel-carrying means generally designated 60b. Each of the two triangular wheel-carrying means 60a and 60b comprises three rigidly interconnected channel members 62 which are fixedly mounted on the corresponding end of a transverse shaft 64. As may be seen in FIG. 3, the transverse shaft 64 lies under the trailer frame and, as indicated in FIG. 4, is journaled in a pair of bearings 65 that are mounted on the underside of the two auxiliary channel members 54. Each of the two triangular wheel-carrying means 60a and 60b is provided with a laterally extending axle 66 for the corresponding wheel, the axle being reinforced by a gusset 68.

The two wheel-carrying structures 60a and 60b are controlled by a manual actuating means in the form of a yoke, generally designated 70, the yoke being connected to the two wheel-bearing means by suitable linkages. The yoke 70 has two arms 72 and 73 interconnected by a transverse member 74. As shown in FIGS. 1 and 2, a suitable bumper 75 is united with the transverse member 74. The bumper 75 carries a pair of combined tail lights and stop lights 76 and the usual license plate 78. The normal position of the yoke 70 for highway travel is the position shown in FIGS. 1 and 2 at which the yoke extends rearward substantially horizontally from the trailer frame so that the bumper 75 provides protection for the motor and propeller of the boat. To raise the two wheels relative to the trailer frame for lowering of the trailer frame, the yoke 70 is swung upward and forward from its normal position to the upright position indicated in broken lines in FIG. 3.

As heretofore stated, it is contemplated that suitable resilient means will be interposed between the yoke 70 and the two wheels 50a and 50b to serve as spring means for yieldingly holding the two wheels in their lower positions, the spring means taking road shocks. For this purpose, the yoke 70 is connected to the wheel-bearing means 60a on one side of the trailer by a linkage that includes a transverse torsion rod 80a and the yoke is connected to the other wheel-bearing means 60b by a second similar linkage incorporating a torsion rod 80b. As indicated in FIG. 4, the two torsion rods 80a and 80b are journaled in suitable bearings 82 on the undersides of the two auxiliary channel members 54.

The yoke arm 72 is fixedly mounted on one splined end of the torsion rod 80a and the second splined end of the same torsion rod is linked with the triangular wheel-carrying means 60a. In the construction shown, a rocker arm 84 on the second splined end of the torsion rod 80a is connected by a pivot 85 to one end of a long link 86 and the second end of the long link is pivotally connected to the wheel-bearing means 60a. In like manner, the second arm 73 of the yoke 70 is fixedly connected to the corresponding end of the second torsion rod 80b. The other end of the second torsion rod 80b carries a rocker arm 90 which is connected by a pivot 92 to a second long link 94 and the long link in turn is pivotally connected to the second triangular wheel-carrying means 60b. It is apparent from an inspection of FIG. 3 that when the yoke 70 is swung upward from its normal position to an upright position, the two wheel-carrying means rotate correspondingly to move each of the two axles 66 upward along an arc 96 for lowering of the trailer frame.

Since the two yoke arms 72 and 73 rotate about different axes provided by the two torsion rods 80a and 80b, some provision is desirable to keep the yoke from binding in its swinging action. For this purpose one yoke arm may be normally of fixed length with the other yoke arm capable of extension and contraction sufficiently to compensate for the different locations of the two torsion rods. In this instance, the yoke arm 72 is normally of fixed length and the second yoke arm 73 is capable of compensating extension and contraction. The yoke arm 73 has a tubular end 98 shown in FIGS. 4 and 5 which slidingly telescopes over a short round bar 100, the bar 100 being fixedly connected to the splined end of the torsion rod 80b. The tubular end 98 is formed with diametrically opposite slots 102 and a pair of rivets 104 carried by the bar 100 extend through these slots to limit the range of extension and retraction of the tubular end relative to the bar 100. A confined coil spring 105 acts between the tubular end 98 and the end of the bar 100.

As heretofore indicated, it is further contemplated that the yoke 70 will be extensible as a whole for the purpose of clearing a relatively large boat on the trailer.

In the construction shown, each of the two arms 72 and 73 includes a telescoping tubular section 106 which is rigidly connected to the transverse member 74 of the yoke. The two tubular sections 106 are normally held against telescoping extension by means of suitable bolts 108, numerous apertures being provided for selective use by the bolts to permit adjustment in the length of the yoke as may be required.

Suitable means may be provided to latch or lock the yoke 70 at its normal lower position. A mechanism for this purpose is shown in FIGS. 8, 9 and 10. The latch structure includes a transverse bar 110 that is welded to the rear end of the trailer frame and extends laterally therefrom, the bar having a half circle recess 112 to seat the yoke arm 72. A second angular transverse bar 114 is mounted on the first bar by a pivot 115 and is formed with a half circle recess 116 to clamp over the upper side of the yoke arm 72. Mounted on the outer end of the bar 114 by a suitable pivot 118 is a latch member 120 having a flange 122 at its free end to swing under the fixed bar 110. The latch member 120 is provided with an aperture 124 and the fixed bar 110 is provided with a similar aperture 125 for engagement by a padlock 126 in the manner shown in FIG. 7.

The auxiliary structure that is adjustably mounted on the trailer frame includes an inverted channel 130 that straddles the central beam 14 from above and is slidable along the beam. As best shown in FIG. 7, this inverted auxiliary channel 130 is formed with downwardly extending brackets 132 on its two sides which straddle the previously mentioned transverse shaft 64. By virtue of this arrangement, the inverted auxiliary channel 130 is shifted along the central beam 14 by the transverse shaft whenever the previously mentioned two auxiliary channel members 54 are shifted along the trailer frame for the purpose of shifting the two ground wheels 50a and 50b.

A series of rollers 134 are carried by the inverted auxiliary channel 130 to lift the boat in response to lowering of the trailer frame. In the construction shown, three of the rollers 134 are mounted on three corresponding pairs of rocker arms 135 which are mounted on the opposite sides of the inverted auxiliary channel 130. These arms are interconnected by links 138 on the opposite sides of the inverted channel and are further connected by links 140 to corresponding levers 142 which are mounted on opposite sides of the inverted channel. The lower arms of the levers 142 are connected by corresponding cables 145 to a corresponding pair of rocker arms 146 that are fixedly mounted on the previously mentioned transverse shaft 64.

FIG. 5 shows the normal positions of the rollers 134 when the yoke 70 is in its normal horizontal position with the trailer frame elevated. When the yoke 70 is swung upward to lower the trailer frame, the transverse shaft 64 is rotated clockwise as viewed in FIG. 6 and the corresponding rotation of the rocker arms 146 causes the two cables 145 to swing the pair of levers 142 counterclockwise to cause all four of the rollers 134 to be elevated to the positions shown in broken lines in FIG. 5.

When the rollers 134 are in their upper effective positions carrying the weight of the boat, the boat may be readily shifted longitudinally to the rear of the trailer. To facilitate such rearward movement of the boat, an additional roller 148 (FIG. 1) may be mounted on a fixed bracket 150 on the rear end of the trailer frame. When the rollers 134 are elevated to facilitate this rearward longitudinal movement of the boat, the yoke 70 is in its upright position straddling the boat. A feature of this embodiment of the invention is the further provision of rollers 152 on the two yoke arms 72 and 73, respectively, for rolling contact with the opposite sides of the longitudinally moving boat.

The manner in which the described trailer serves its purpose may be readily understood from the foregoing description. Normally the ground wheels 50a and 50b are in their lowermost positions with the trailer frame elevated as shown in FIGS. 1 and 2 for transportation of the boat, the yoke 70 being in its normal lower position to serve as a guard for the rear end of the boat. At this time, the cable 44 is reeled in by the winch 40 to hold the boat forward on the two cradles with the forward end of the boat snubbed against the stabilizing bracket 35. The yoke 70 is secured in its normal lower position in a positive manner by the padlock 126. As the trailer moves along the highway, road shocks delivered to the two wheels 50a and 50b are absorbed by the two torsion rods 80a and 80b.

When the trailer is backed into the edge of a body of water, such as a lake, with the water somewhat below the level of the wheel axles 66, the bolt 24 is withdrawn from the hitch arm 20 to permit the hitch arm to swing upward and thereby avoid interference with lowering of the trailer frame. The yoke 70 is then unlocked and swung upwardly manually to cause the trailer frame to be lowered into the water.

The lowering of the trailer frame involves clockwise rotation of the two triangular wheel-carrying means 60a and 60b as viewed in FIGS. 2 and 3 with corresponding clockwise rotation of the transverse shaft 64. This clockwise rotation of the transverse shaft swings the two rocker arms 146 clockwise as indicated in FIG. 3 to lift the four rollers 134 and thereby lift the boat by its keel. With the weight of the boat carried by the rollers 134, the winch 40 is released to pay out the cable 44 and the boat is manually maneuvered rearward on the four rollers 134 and the fixed roller 148. During this rearward movement of the boat, it is stabilized by the two rollers 152 on the upright arms 72 and 73 of the yoke 70. It is apparent that this procedure for launching a boat is exceedingly simple since the trailer frame maintains its substantially normal attitude as it is lowered into the water.

The boat is loaded by the reverse procedure. The winch 40 is operated by the crank 42 to pull the boat onto the lower trailer frame. The yoke 70 is, of course, upright to stabilize the boat and the rollers 134 are in their upper positions to permit the boat to be rolled forward on the way to its normal snubbed position. The yoke 70 is then swung downward manually to raise the trailer frame and simultaneously lower the rollers 134 to permit the boat to rest in a stable manner in the two cradles 32 and 34.

My description in specific detail of the selected embodiment of the invention will suggest various changes, substitutions and other departures from my disclosure within the spirit and scope of the appended claims.

I claim:

1. In a trailer having a frame to carry a heavy object and having a pair of ground wheels to support the frame, the combination therewith of: means carrying said wheels and pivotally mounted on said frame to swing relative thereto to shift the wheels in arcs between low positions relative to the frame to elevate the frame and high positions to lower the frame; actuating means on said frame operatively connected with said wheel-carrying means for actuation thereof to raise and lower the frame; a series of rollers spaced longitudinally of said frame, said rollers being movable between lower retracted positions and upper effective positions for lifting the heavy object relative to the frame for movement of the heavy object off the frame longitudinally thereof by roller action; and means to move said rollers from their lower retracted positions to their upper effective positions in response to upward movement of said wheel-carrying means and vice versa, said actuating means comprising a U-shaped yoke with two arms pivotally connected to said frame, said yoke having a normal lower position overhanging the rear of the frame to serve as a bumper for the trailer with the two arms of the yoke extending forward, said yoke being movable to an upright position to raise said wheels thereby to lower the frame.

2. A combination as set forth in claim 1 in which rollers are mounted on said two arms of the yoke for rolling contact with the opposite side of the heavy object in the course of movement of the heavy object longitudinally of the frame in the loading and unloading of the heavy object.

3. In a trailer for towing a boat or the like having a frame for hitching to a towing vehicle and having two opposite ground wheels to support the frame, the combination therewith of: two means on opposite sides of the frame carrying said two wheels respectively, each of said wheel-carrying means being pivotally mounted on the frame to swing in an arc between a low position relative to the frame to elevate the frame and a high position to lower the frame; manually operable means on said frame in the form of a lever to actuate said two wheel-carrying means simultaneously; and two linkages operatively connecting said manually operable means with said two wheel-carrying means, respectively, each of said linkages including a torsion bar extending transversely of the frame with one end of the torsion bar connected to the manually operable means and the other end connected to the corresponding wheel-carrying means for resilient resistance to shocks transmitted to the corresponding ground wheel when the trailer is traveling under load.

4. In a trailer having a frame supported by a pair of opposite wheels, the combination therewith of a mechanism for raising and lowering the frame, comprising: means carrying said wheels and pivotally mounted on said frame to swing relative thereto to shift the wheels in arcs between low positions relative to the frame to elevate the frame and high positions to lower the frame; a U-shaped yoke having two arms interconnected by a transverse member, said two arms being pivotally connected to said frame for swinging movement of the yoke, said yoke having a normal position extending rearward from the rear end of the frame with said transverse member serving both as a bumper and as means to mount a tail light and a license plate, said yoke being operatively connected to said wheel-carrying means and being swingable forward from its normal rearward position to an upright position straddling the loaded boat to swing said two-wheel-carrying means from their high positions to their lower positions and vice versa.

5. A combination as set forth in claim 4 in which said two arms of the yoke are of telescoping construction for extension to multiply the manual force applied thereto and to clear a relatively high boat on the trailer.

6. A combination as set forth in claim 4 which includes means to lock said yoke in its normal lower position.

7. In a trailer having a main frame to carry a heavy object and having a pair of ground wheels to support the main frame, the combination therewith of: auxiliary support structure mounted on said main frame at an intermediate region thereof to support the main frame, said auxiliary structure being adjustable longitudinally of the main frame; two means on opposite sides of said auxiliary structure carrying said two wheels, respectively, said two wheel-carrying means being pivotally mounted on said auxiliary structure to swing in arcs to shift said wheels between high positions relative to the main frame for lowering the main frame and low positions to elevate the main frame; manually operable means carried by said auxiliary structure to actuate said two wheel-carrying means simultaneously; and means to anchor the auxiliary structure at adjusted positions along the length of the main frame to balance the load on said wheels.

8. A combination as set forth in claim 7 in which said main frame is adjustably extensible to accommodate loads of various lengths.

9. A combination as set forth in claim 7 in which said main frame has two longitudinal side members and a central longitudinal member and in which said auxiliary structure comprises channel members straddling said three frame members, said three channel members being interconnected.

10. In a trailer for towing a boat or the like wherein a trailer frame is supported by a pair of ground wheels, the combination therewith of: two means on opposite sides of the frame carrying said two wheels, respectively, each of said wheel-carrying means being pivotally mounted to swing in an arc to carry the corresponding wheel between a low position relative to the frame and a high position relative to the frame for raising and lowering the frame; a pair of torsion bars extending transversely of the frame; and a U-shaped yoke having two arms on opposite sides of the frame, one of said arms being fixedly connected to one end of one of said two torsion bars on one side of the frame, the other of said arms being fixedly connected to the end of the other of the two torsion bars on the other side of the frame, the other ends of said two torsion bars being operatively connected, respectively, to said two wheel-carrying means, said yoke being swingable forward from a substantially horizontal position with said arms extending forward to an upright position to raise said two wheels for lowering of the frame.

11. A combination as set forth in claim 10 in which the outer ends of said two arms are interconnected by a transverse member and in which one of said arms is constructed for extension and contraction to compensate for changes in the distance between said transverse member and the corresponding torsion bar in the swinging movement of the yoke.

References Cited in the file of this patent

UNITED STATES PATENTS

| | | |
|---|---|---|
| 2,453,388 | Schramm | Nov. 8, 1948 |
| 2,684,021 | Ratzlaff | July 20, 1954 |
| 2,793,774 | Lovegreen | May 28, 1957 |
| 2,807,381 | Tegeler | Sept. 24, 1957 |
| 2,827,187 | Elmore | Mar. 18, 1958 |
| 2,828,036 | White | Mar. 25, 1958 |
| 2,835,401 | Byrd | May 20, 1958 |
| 2,849,136 | Moore | Aug. 26, 1958 |
| 2,905,481 | Schramm | Sept. 22, 1959 |
| 2,957,593 | Evans | Oct. 25, 1960 |